June 21, 1960

C. E. DRAKE
SAW GRINDERS 2,941,425

Filed May 26, 1958

INVENTOR.
CLAUD E. DRAKE
BY *Alfred W. Petchaft*
ATTORNEY

June 21, 1960  C. E. DRAKE  2,941,425
SAW GRINDERS

Filed May 26, 1958  9 Sheets-Sheet 3

FIG. 3

INVENTOR.
CLAUD E. DRAKE
BY
ATTORNEY

June 21, 1960

C. E. DRAKE 2,941,425

SAW GRINDERS

Filed May 26, 1958

INVENTOR.
CLAUD E. DRAKE
BY Alfred W. Petchaft
ATTORNEY

June 21, 1960 C. E. DRAKE 2,941,425
SAW GRINDERS

Filed May 26, 1958 9 Sheets-Sheet 5

INVENTOR.
CLAUD E. DRAKE
BY
ATTORNEY

June 21, 1960

C. E. DRAKE 2,941,425

SAW GRINDERS

Filed May 26, 1958

INVENTOR.
CLAUD E. DRAKE

BY

ATTORNEY

June 21, 1960

C. E. DRAKE 2,941,425

SAW GRINDERS

Filed May 26, 1958

INVENTOR.
CLAUD E. DRAKE

BY *Alfred W. Petchaft*

ATTORNEY

United States Patent Office 2,941,425
Patented June 21, 1960

2,941,425

SAW GRINDERS

Claud E. Drake, Brentwood, Mo.
(2723 Ivanhoe Ave., St. Louis 39, Mo.)

Filed May 26, 1958, Ser. No. 737,576

12 Claims. (Cl. 76—48)

This invention relates in general to certain new and useful improvements in saw grinders and, more particularly, to apparatus for grinding and sharpening circular saws and similar circular cutters.

In the manufacture and sharpening of circular saws having carbide and dense alloy tips, it is necessary to grind the tips to the proper contour in a simple and efficient manner and without generating excessive heat which will alter the metallurgical properties of the saw tips. One such type of saw is that described in my U.S. Letters Patent No. 2,720,229. The grinding operations in this type of circular saw and other circular saws of similar construction necessitate accurate contouring of the teeth and, furthermore, since the cutters come in a rather large number of sizes and gauges and a wide variety of tooth shapes and pitches, it is necessary to provide a grinding machine which can be quickly and conveniently set up to accommodate any of these variables. Moreover, the machine must be capable of relatively rapid change with a minimum amount of time involved.

It is, therefore, one of the objects of the present invention to provide a saw grinder which is capable of accurate and precise grinding of the teeth of carbide tipped saws and similar circular cutters.

It is also an object of the present invention to provide a saw grinder of the type stated which is readily adjustable so as to accommodate a wide range of different saw sizes and configurations and can be quickly and easily set up to grind a saw to any particular set of dimensions or contour.

With the above and other objects in view, my invention resides in the novel features of form, construction, arrangement, and combination of parts presently described and pointed out in the claims.

In the accompanying drawings—

Referring now in more detail and by reference characters to the drawings, which illustrate a preferred embodiment of the present invention, A designates a saw grinder comprising a base casting 1 having a flat top wall portion 2 provided with a vertical spindle 3 having a threaded axial bore 4 for receiving an elevating screw 5, the upper end of which is provided with a crank handle 6. Slidably fitted around the spindle 3 is a casting 7 provided with a split hub 8 formed with spaced parallel flanges 9, 10, which are threaded for receiving a clamping screw 11, the outer end of which is provided with an operating lever 12. At its upper end, the casting 7 is integrally provided with a plate-like flange 13, and secured to the upper face of the plate-like flange 13 by bolts 14 is a base plate 15 which is bored for a snug fitting reception of a bushing 16 which fits around the elevating screw 5. The flange 13 is provided with a vertical aperture 17 for receiving a thrust bearing 18 which is aligned with the bushing 16 and encircles the elevating screw 5. Mounted on opposite ends of the base plate 15 are auxiliary support plates 19, 19', which rest facewise on the base plate 15, and, at their contact faces, the base plate 15 and auxiliary support plates 19, 19', are each slotted for receiving longitudinal keys 20, 20'. The base plate 15 is, furthermore, provided with spaced aligned longitudinal slots 21, 21', which are each in spaced parallel relationship to the keys 20, 20', and projecting through the slots 21, 21', are bolts 22, 22', which pass through clearance holes h, h', in the auxiliary support plates 19, 19'. The bolts 22, 22', furthermore, project downwardly through sleeves 23, 23', which are mounted on the lower side of the base plate 15 and, at their lower ends, the locking bolts 22, 22', are provided with manipulating cranks 24, 24'.

Rigidly secured to the upper faces of the auxiliary support plates 19, 19', respectively, by means of the bolts 22, 22', are ball bearing slides 25, 25', having slide plates 26, 26', adapted for movement lengthwise along the auxiliary support plates 19, 19', and mounted on the slides 26, 26', are upper ball bearing cross slides 27, 27', having slide plates 28, 28', adapted for movement at right angles to the slide plates 26, 26'. Preferably, the slides 25, 25', 27, 27', are of the dust-proof ball bearing type disclosed and claimed in my copending application Serial No. 690,000, filed October 14, 1957. Secured to the upper side of the cross slides 27, 27', by means of bolts 29, 29', are grinder wheel support castings 30, 30', provided with upstanding trunnions 31, 32, 31', 32', having stud-like pins 33, 34, 33', 34', projecting therethrough which tiltably support motor-grinder wheel mounting plates 35, 35', having rigidly mounted thereon electric motors 36, 36'. Also rigidly mounted on the plates 35, 35', in spaced relation to the electric motors 36, 36', are bearing housings 37, 37', having spaced aligned bearings b, b', therein which rotatably support grinder wheel spindles 38, 38', the outer ends of which are provided with diamond grinding wheels 39, 39'. The motors 36, 36', and grinder wheel spindles 38, 38', each have mounted thereon aligned pulleys 40, 41, 40', 41', respectively, and operatively trained around the pulleys 40, 41, 40', 41', are driving belts 42, 42'. Between the trunnions 31, 32, 31', 32', the plates 35, 35', are cut away in the provision of arcuate clearance spaces 43, 43', for purposes presently more fully appearing. Rigidly connected to, and extending rearwardly of, the plates 35, 35', are arms 44, 44', the rear ends of which are threaded for receiving bolts 45, 45', which project through arcuate slots 46, 46', on upstanding arcuate brackets 47, 47', which are, in turn, rigidly mounted on the castings 30, 30'.

Mounted on one lateral margin of each of the auxiliary support plates 19, 19', are longitudinal slides 48, 48', which are shiftable by means of feed screws 49, 49', having operating handles 50, 50', at the ends thereof, and secured to the longitudinal slides 48, 48', by means of angle brackets 50a, 50b, are vertical slides 51, 51', which are movable by means of feed screws 52, 52', having manipulating handles 53, 53', at the ends thereof. The slides 51, 51', are connected to channels 54, 54', the upper ends of which are integrally provided with horizontal flange plates 55, 55'. Mounted on the upper faces of the flange plates 55, 55', are template slide assemblies 56, 56', comprising slides 57, 57', shiftable by means of feed screws 58, 58', and having manipulating handles 59, 59', at the ends thereof, and bolted or otherwise removably secured to the upper faces of the slides 57, 57', are cam-like templates 60, 60', for purposes presently more fully appearing.

Press-fitted into the upper slide plates 28, 28', and extending lengthwise outwardly therefrom are short rods 61, 61', the outer ends of which are provided with ball joint bushings 62, 62', which slidably receive the lower ends of vertical operating rods 63, 63', the upper ends of which are provided with manipulating knobs 64, 64'. Intermediate their ends, the rods 63, 63', are provided with spaced sleeves 65, 66, 65', 66', respectively, and diametrally reduced portions 67, 67'. Fitted around the diametrally reduced portions 67, 67', and within the sleeves 65, 66, 65', 66', are spaced coil springs 68, 69, 68', 69', respectively, and also encircling the diametrally reduced portions 67, 67', intermediate the sleeves 65, 66, 65', 66', respectively are ball joint bushings 70, 70'. The ball joint bushings 70, 70', are fitted in retaining eyes 71, 71', and projecting outwardly from the eyes 71, 71', are rod-like pins 72, 72', rigidly connected to ears 73, 73', which are, in turn, integrally formed on the channels 54, 54'.

Bolted or otherwise rigidly secured to the base casting 1 and extending upwardly from one end thereof is a column 74 having a horizontal upper face 75 and extending upwardly from the face 75 is a short flange 76. Bolted to the flange 76 and extended in spaced parallel relation to the surface 75 is a plate 77 which is drilled for receiving spaced parallel bushings 78, 79. Set into the upper face 75 are bushings 80, 81, which are aligned with the bushings 78, 79, respectively, and journal spaced parallel vertical shafts 82, 83. Keyed or otherwise rigidly secured to the shafts 82, 83, below the plate 77 are meshing gears 84, 85, the gear 84 being bored for receiving a thrust bearing 86. The shaft 82 extends downwardly in the provision of a threaded shank 87 for engagement with a threaded boss 88, which is rigidly secured to a slide 89, the latter being vertically shiftable along one face of the column 74. The shaft 83 extends upwardly beyond the plate 77 and at its outer end is provided with a crank handle 90 and mounted on the shaft 83 between the plate 77 and crank handle 90 is a spacer sleeve 91.

Integral with, and extending outwardly from, the slide 89 is an arbor-table support casting 92, the upper end of which is provided with a cross slide 93 for slidably receiving an arbor-table 93'. Journaled in and extending lengthwise in the arbor-table 93' is a threaded feed screw 94, one end of which is provided with a crank handle 95, and rigidly mounted on the one end of the feed screw 94 is a locking collar 96. Shiftably mounted on the upper surface of the arbor-table 93' is a saw arbor 97 having a depending boss 98 which threadedly engages the feed screw 94. The saw arbor 97 is, furthermore, provided with a split hub 99 having spaced parallel upstanding flanges 100, 101, which are threaded for receiving bolts 102, 103. Snugly positioned within the hub 99 are aligned bushings 104, 105, which rotatably support a horizontal arbor spindle 106. The arbor spindle 106 is also provided with a diametrally enlarged portion 107 which terminates in a frusto-conical flange 108 having an axial bore 109, and centrally thereof the enlarged portion 107 is provided with a tapped axial bore 110. Co-operating with the flange 108 is a removable flange 111 provided with a central bore 112, and extending through the bore 112 and tapped axial bore 110 is a bolt 113 provided intermediate its ends with an enlarged collar 113'.

Figure 1:
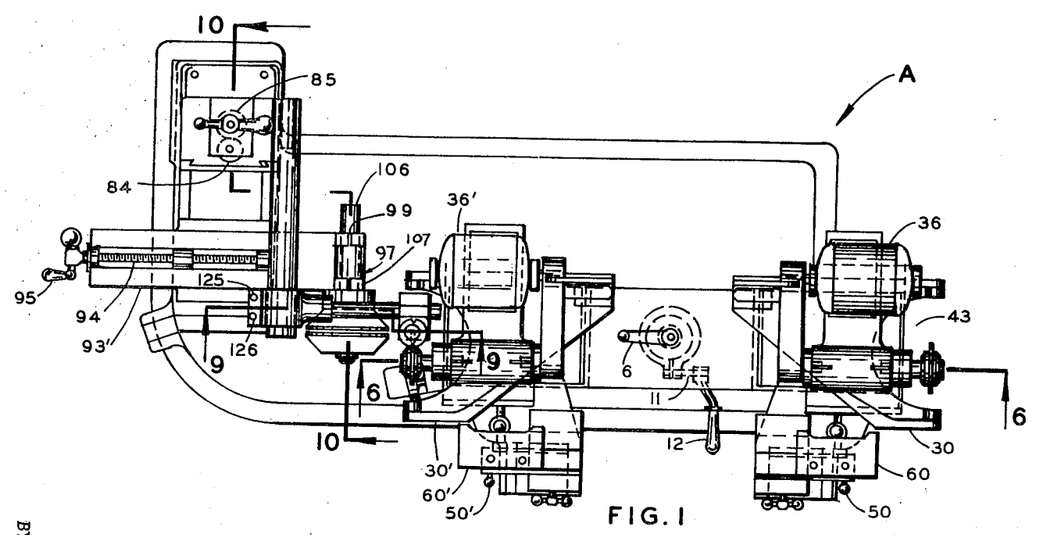
Fig. 1 is a top plan view of a saw grinder constructed in accordance with and embodying the present invention.
Figure 2:
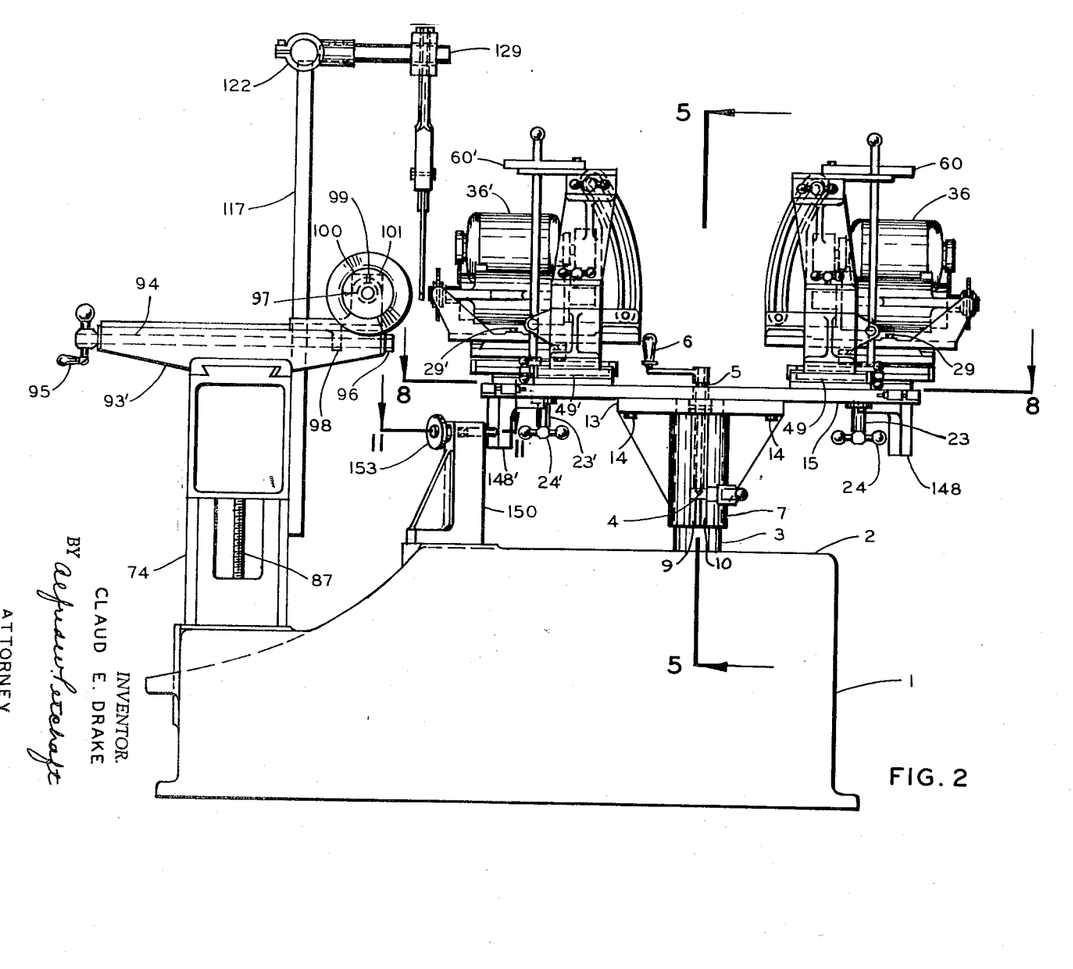
Fig. 2 is a front elevational view of the saw grinder.
Figure 3:
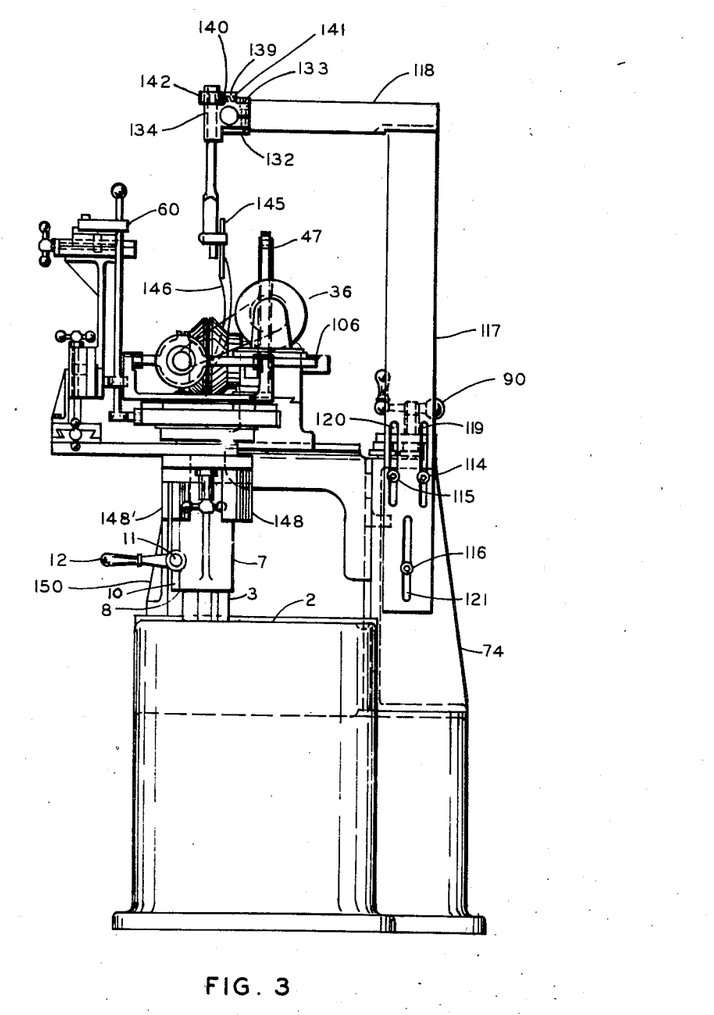
Fig. 3 is a side elevational view of the saw grinder.
Figures 4, 7:
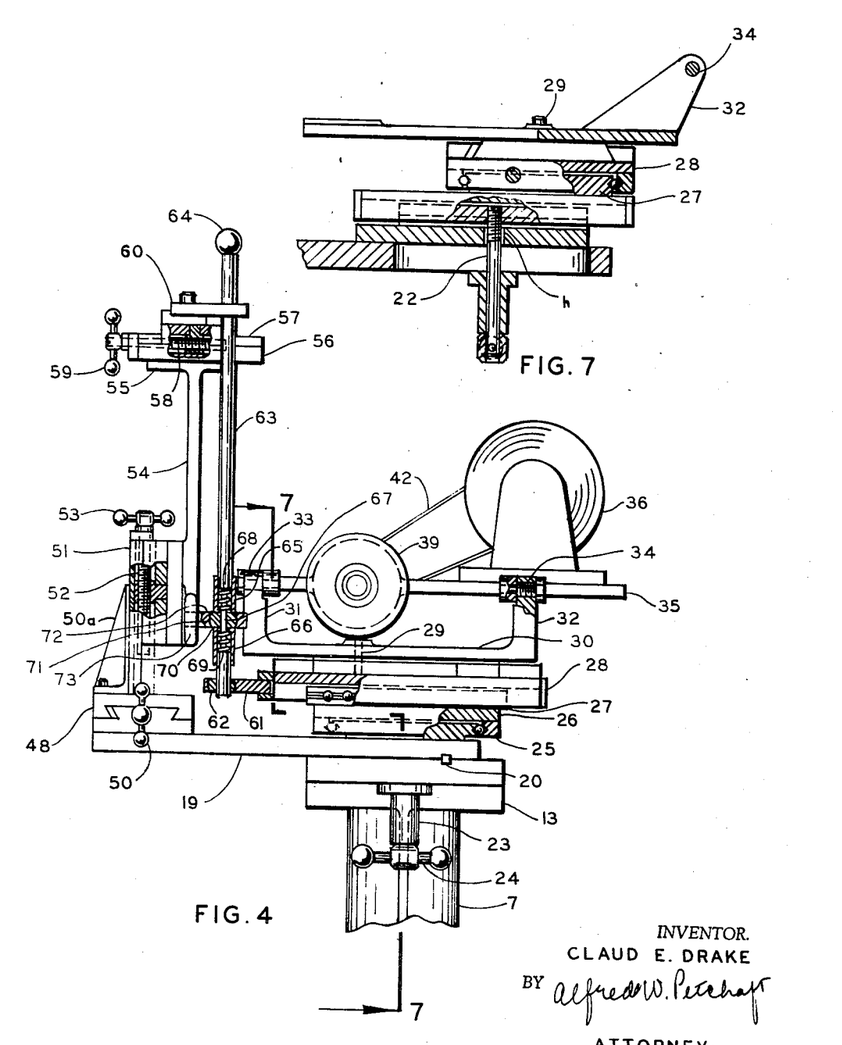
Fig. 4 is an enlarged fragmentary side elevational view partly broken away and in section of the saw grinder.
Fig. 7 is a fragmentary sectional view taken along line 7—7 of Fig. 4.

Secured facewise against the column 74 by means of bolts 114, 115, 116, and extending upwardly therefrom is a vertical arm 117, the upper end of which is provided with a forwardly extending horizontal arm 118. As seen by reference to Fig. 3, the bolts 114, 115, 116, pass through vertical slots 119, 120, 121, formed in the arm 117 so as to permit vertical adjustment thereof with respect to the column 74. Rigidly secured to the forward end of the horizontal arm 118 is a collar 122 split in the provision of spaced opposed flanges 123, 124, which are tapped for receiving clamping nuts 125, 126. The collar 122 is also provided with a horizontal sleeve 127 having a bore 128, which receives a horizontally extending rod 129, the latter being rigidly held within the bore 128 by means of set screws 130, 131. Mounted on the outer end of the rod 129 is a split collar 132 provided with a clamping bolt 133 which permits adjustable positioning of the collar 132 along the rod 129. Formed in the collar 132 is a vertical bore 134 having spaced aligned bearings 135, 136, positioned therein for journaling a vertical rod 137, and rigidly secured to the upper end of the rod 137 is a locking collar 138. At its upper end, the split collar 132 is provided with a small horizontal bore 139 for slidably receiving a ball 140 which is forwardly biased by means of a spring 141. The ball 140 normally engages the periphery of the small ratchet-like wheel 142, which is mounted on the rod 137 adjacent the locking collar 138. Pivotally secured adjacent the lower end of the rod 137 is a pair of links 143, 144, and rigidly secured to the links 143, 144, intermediate its ends is a small bifurcated vertical rod 145. Rigidly mounted at the lower end of the rod 145 is an arcuate indexing arm 146, the lower end of which terminates in spaced relation to the flanges 108, 111. Spaced upwardly from the links 143, 144, the rod 137 is bored for receiving a spring 147 which bears against the short rod 145 so as to bias the upper end thereof to the right, reference being made to Fig. 3.

Figures 5, 11:
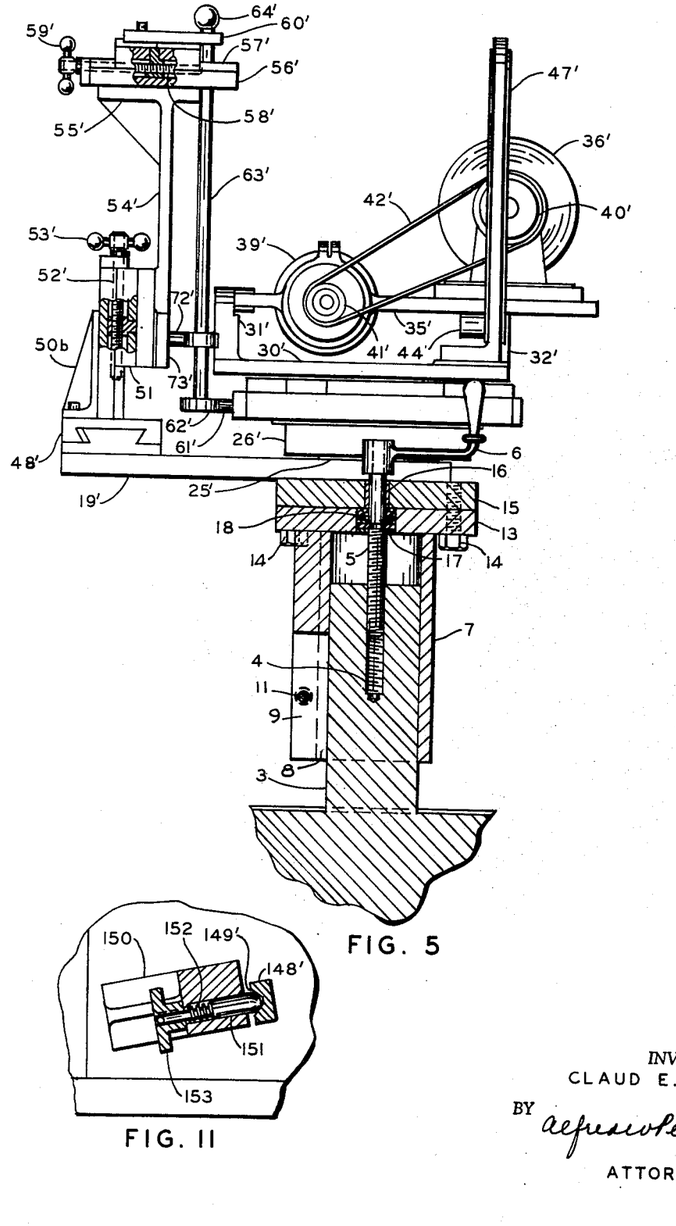
Fig. 5 is a fragmentary sectional view taken along line 5—5 of Fig. 2.
Fig. 11 is a fragmentary sectional view taken along line 11—11 of Fig. 2.
Figure 6:
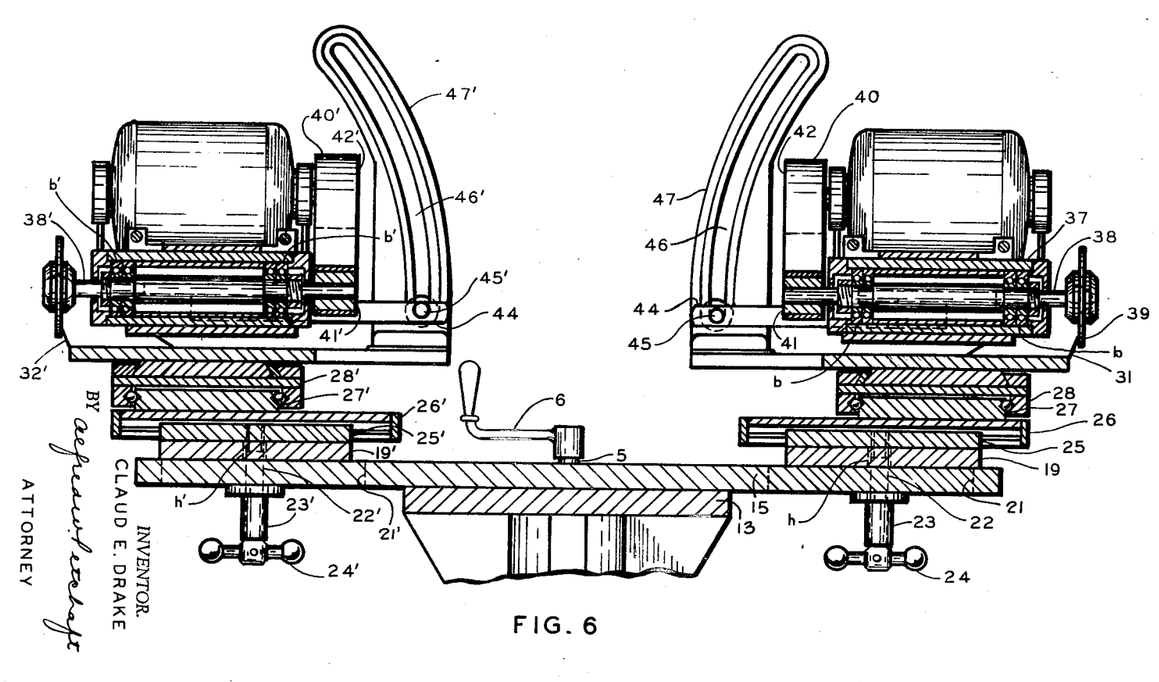
Fig. 6 is a fragmentary sectional view taken along line 6—6 of Fig. 1.
Figure 8:
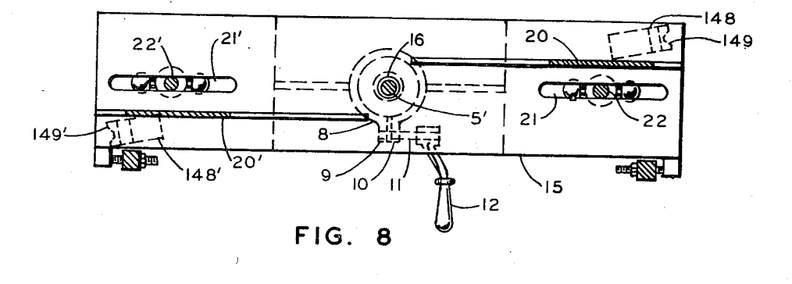
Fig. 8 is a fragmentary sectional view taken along line 8—8 of Fig. 2.
Figures 9, 10:
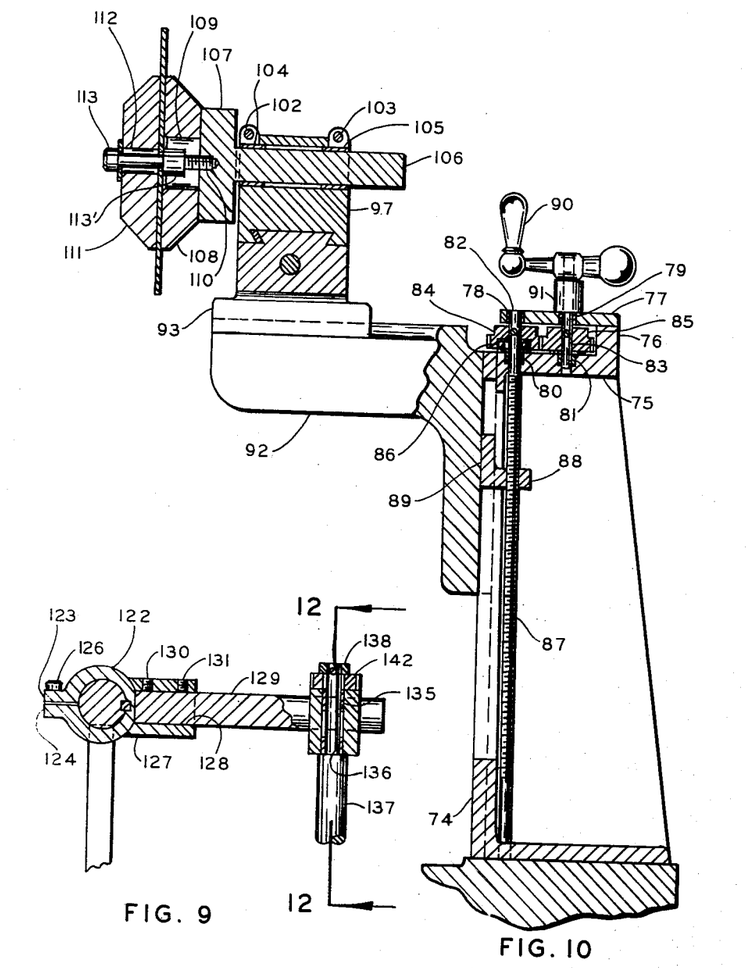
Figs. 9 and 10 are fragmentary sectional views taken along lines 9—9 and 10—10, respectively, of Fig. 1.

Mounted on the underside of the base plate 15 at opposite ends thereof as shown in Fig. 8 are angularly offset blocks 148, 148', provided with outwardly presented V-shaped vertical slots 149, 149', and rigidly mounted on the base casting 1 in forwardly spaced relation to the spindle 3 is an upstanding channel 150 as shown in Fig. 11. At its upper end, the channel 150 is bored for receiving a stop pin 151 which is biased into optional locking engagement with either the slot 149 or the slot 149' by means of a spring 152. At one end, the pin 151 is provided with a manipulating handle 153 which permits movement of the locking pin 151 out of engagement with slots 149, 149'.

Figures 12, 15:
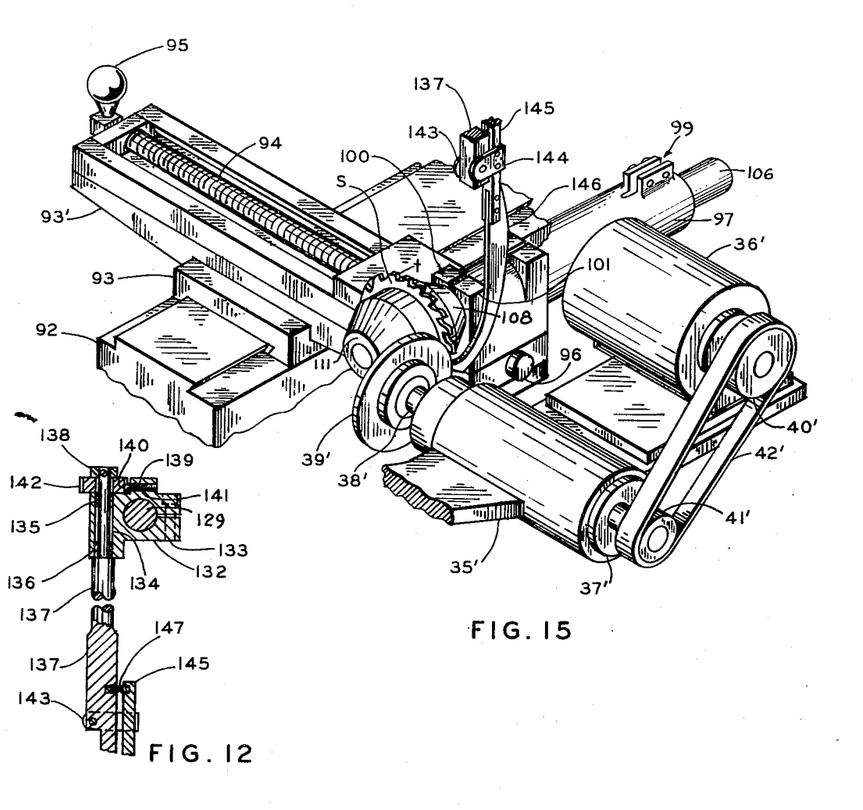
Fig. 12 is a fragmentary sectional view taken along line 12—12 of Fig. 9.
Figs. 14 and 15 are fragmentary perspective views showing the manner of grinding a circular saw.
Figure 13:
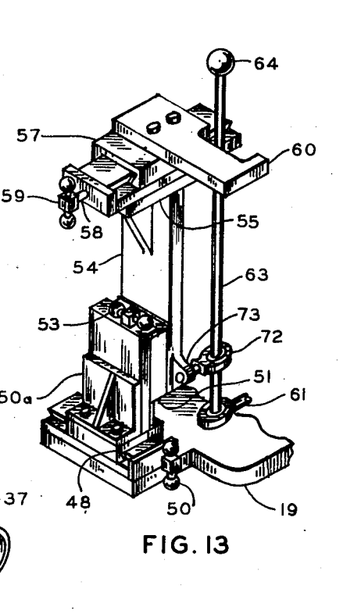
Fig. 13 is a fragmentary perspective view showing one of the templates and operating rod associated therewith.
Figure 14:
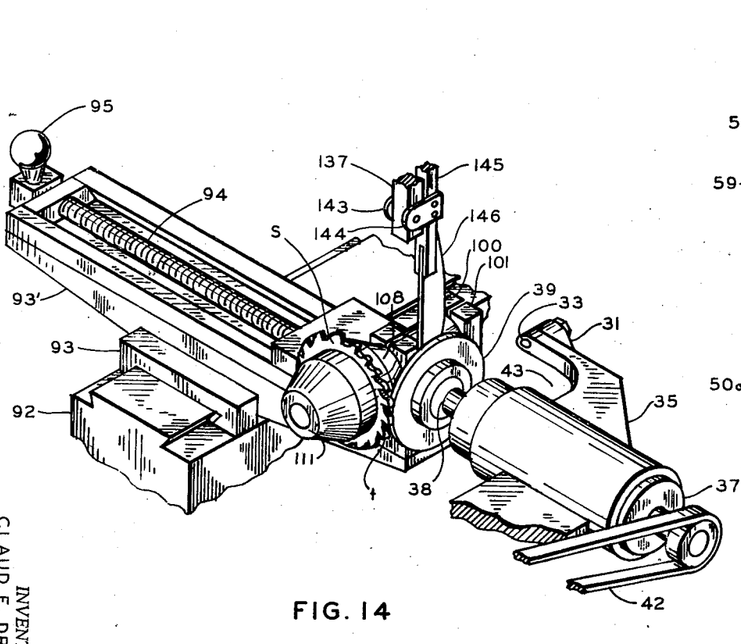

In use, a circular saw S is mounted between the flanges 108, 111, and the bolt 113 is tightened so as to firmly grip the saw S between the flanges 108, 111. The arbor 97 is then elevated by means of the crank handle 90 and transversely shifted by means of the crank handle 95 so as to properly position the saw S prior to grinding the contour on the teeth thereof. The arbor spindle 106 is then rotated so that the indexing arm 146 engages one of the teeth inwardly from the outer periphery thereof. The position of the grinder wheel 39' is then adjusted with respect to the teeth, depending upon the desired contour to be ground on the tooth t. The precise position of the grinder wheels 39, 39', are set by shifting the several slides 48, 48', 51, 51', 57, 57', and, if necessary, by loosening the bolts 45, 45', so as to tip the grinder wheels 39, 39', at an angle to the vertical. Since the rods 63, 63', are connected to the upper slides 27, 27', which are, in turn, mounted on the lower slides 25, 25', the rods 63, 63', are universally movable. The grinder support castings 30, 30', and their associated grinder wheels 39, 39', mounted on the upper slides 27, 27', with the result that the grinder wheels 39, 39', are universally movable and will traverse a path as determined by the contour of the templates 60, 60'. The templates 60, 60', are selected according to the desired contour or profile to which the tooth $t$ is to be ground. With the stop pin 151 biased into locking engagement with the slot 149, the grinder wheel 39 will be presented toward one face of the saw S, as shown in Fig. 14, and, upon starting the motor 36, the grinder wheel 39 will rotate. The rod 63 is then moved along the template 60, causing the grinder wheel 39 to shape one side of the tooth $t$. Thereafter, the indexing arm 146 is pulled back and the saw S rotated until the next succeeding tooth to be ground is rotated into position, whereupon, the indexing arm 146 is released so as to hold the saw S in position. Such tooth and other succeeding teeth are ground in the same manner as the first tooth $t$, previously described, and, when all of the teeth $t$ are ground on one side to the proper contour, the handle 153 is pulled back, releasing the stop pin 151 from the block 148', whereupon, the base plate 15 is rotated 180° until the stop pin 151 engages the block 148, at which time the grinder wheel 39' will be presented toward the opposite face of the saw S, as shown in Fig. 15. The other faces of the teeth $t$ are then ground by the grinder wheel 39' by movement of the operating rod 63' along the template 60'.

It will be apparent that by moving the slides 57, 57', on which the templates 60, 60', are mounted, to positions toward and away from the operating rods 63, 63', the length of the path through which the grinder wheels 39, 39', move will be the same, but such path will be at greater or lesser distance from the center plane of the saw S. Thus, by shifting the templates 60, 60', toward the rods 63, 63', the grinder wheels 39, 39', will traverse their predetermined paths at a greater distance from the center plane of the saw S, and, similarly, by shifting the templates 60, 60', away from the rods 63, 63', the grinder wheels will be moved toward the center plane of the saw S. Thus, it is possible to grind the same contour on saws of various thicknesses. Also, by elevating the operating rods 63, 63', by means of the slides 51, 51', the distance from the templates 60, 60', to the ball joint bushings 70, 70', will be decreased, and, at the same time, the distance between the bushings 70, 70', and the bushing 62, 62', will be correspondingly increased. The bushings 70, 70', therefore, function as movable fulcrums allowing for change in the lever-arm distances from such fulcrums to the templates 60, 60', and bushings 62, 62'. Thus, by elevating the rods 63, 63', the grinder wheels 39, 39', will describe a path geometrically similar to the templates 60, 60', but will vary in size, depending upon the distance the templates 60, 60', are elevated. Similarly, by lowering the templates 60, 60', the lever-arm distance between the bushings 70, 70', and templates 60, 60', will be increased and the distances between the bushings 70, 70', and bushings 62, 62', will be increased, thereby increasing the length of the geometrically similar path described by the grinder wheels 39, 39'. This permits geometrically similar contours to be ground on similar saws which are identical in configuration but proportionately larger or smaller in tooth size and diameter.

In certain types of saws, all of the teeth are not ground to the same contour, but may have differently shaped teeth arranged in a repeating pattern. In such case, it is necessary to have templates for each different tooth pattern. The present invention permits the templates to be readily interchanged, thereby reducing the amount of time and effort necessary to set up the machine for accommodation of a wide variety of tooth shapes and sizes.

It should be understood that changes and modifications in the form, construction, arrangement, and combination of the several parts of the saw grinders may be made and substituted for those herein shown and described without departing from the nature and principle of my invention.

Having thus described my invention, what I claim and desire to secure by Letters Patent is:

1. A machine for grinding work-pieces such as circular saws and similar circular cutters, said machine comprising a base, a pivot mounted on the base, an intermediate base-plate rotatably mounted on the pivot, a pair of opposed grinding members operatively mounted on said intermediate base-plate, a saw-supporting arbor mounted on the base independently of the intermediate base for supporting the work-piece adjacent to the path of movement of the intermediate base-plate, means by which either of said grinding members may be optionally presented toward said arbor, and means for independently moving either of said grinding members with respect to the intermediate base-plate along a predetermined path.

2. A machine for grinding work-pieces such as circular saws and similar circular cutters, said machine comprising a base, a pivot mounted on the base, an intermediate base-plate rotatably mounted on the pivot, a pair of opposed grinding members slidably mounted on said intermediate base-plate for universal planar movement, a saw-supporting arbor mounted on the base independently of the intermediate base for supporting the work-piece adjacent to the path of movement of the intermediate base-plate, means by which either of said grinding members may be optionally presented toward said arbor, and means for independently moving either of said grinding members with respect to the intermediate base-plate along a predetermined path.

3. A machine for grinding work-pieces such as circular saws and similar circular cutters, said machine comprising a base, a pivot mounted on the base, an intermediate base-plate rotatably mounted on the pivot, slide means operatively mounted on said intermediate base-plate and being universally movable in a plane perpendicular to the pivot, grinder means mounted on said slide means for movement therewith, a template carried by the intermediate base-plate adjacent to each slide means and means operatively connected to said slide means and bearing against said template for moving said grinder means along a predetermined path established by the template.

4. A machine for grinding work-pieces such as circular saws and similar circular cutters, said machine comprising a base, a pivot mounted on the base, an intermediate base-plate rotatably mounted on the pivot, slide means operatively mounted on said intermediate base-plate and being universally movable in a plane perpendicular to the pivot, grinder means mounted on said slide means for movement therewith, cam-like means carried by the intermediate base-plate and located adjacent to each slide means, a swing-bearing also carried by the intermediate base-plate and located adjacent to each slide means, a rod operatively mounted in each swing-bearing and being also connected to said slide means, each rod being adjacent one of said cam-like means for shifting the associated slide means along a predetermined path established by the shape of the cam-like means.

5. A machine for grinding work-pieces such as circular saws and similar circular cutters, said machine comprising a base, an intermediate base-plate swingably mounted on the base, means for optionally holding the intermediate base-plate in two different positions, means on the base independent of the base-plate for supporting the work-piece in a work-position, a pair spaced slide means mounted on said intermediate base-plate and each being universally movable in a plane, one of said slide members being located so as to be proximate to the work-position when the base is held in one of its two positions and the other of said slide members being located so as to be proximate to the work-position when the base is held in the other of its two positions, grinder means mounted on each slide means for movement therewith, a template operatively associated with each slide means, and means connected to each slide means and movable along said template for independently shifting each said grinder means along a path determined by said cam-like means.

6. A machine for grinding circular saws and similar circular cutters, said machine comprising a base, a pair of spaced slide means mounted on said base and each being universally movable in a plane, grinder means mounted on each slide means for movement therewith, a saw-supporting arbor, means by which said slide means and grinder means may be rotated in unison about a vertical axis so as to optionally present either grinder means toward said saw-supporting arbor, cam-like means operatively associated with each slide means, and means connected to each slide means and movable along said cam-like means for independently shifting each said grinder means along a path determined by said cam-like means.

7. A machine for grinding circular saws and similar circular cutters, said machine comprising a base, a pair of spaced lower slides linearly shiftable with respect to said base, a pair of upper slides one each mounted on said lower slides and being shiftable at right angles thereto whereby each upper slide is universally movable in a plane, grinder means operatively mounted on each upper slide for movement therewith, a saw-supporting arbor, means by which either of said grinder means may be optionally presented toward said arbor, cam-like means operatively associated with each upper slide, and means connected to each upper slide and movable along said cam-like means for independently shifting each said grinder means along a path determined by said cam-like means.

8. A machine for grinding circular saws and similar circular cutters, said machine comprising a base, a pair of spaced lower slides linearly shiftable with respect to said base, a pair of upper slides one each mounted on said lower slides and being shiftable at right angles thereto whereby each upper slide is universally movable in a plane, grinder means operatively mounted on each upper slide for movement therewith, a saw-supporting arbor, means by which either of said grinder means may be optionally presented toward said arbor, cam-like means operatively associated with each upper slide, and a rod operatively connected to each upper slide and movable along said cam-like means for independently shifting each said grinder means along a path determined by said cam-like means, each said rod being rockable about a fulcrum point intermediate its ends.

9. A machine for grinding circular saws and similar circular cutters, said machine comprising a base, a pair of spaced lower slides linearly shiftable with respect to said base, a pair of upper slides one each mounted on said lower slides and being shiftable at right angles thereto whereby each upper slide is universally movable in a plane, grinder means operatively mounted on each upper slide for movement therewith, a saw-supporting arbor, means by which either of said grinder means may be optionally presented toward said arbor, cam-like means operatively associated with each upper slide, a rod operatively connected to each upper slide and movable along said cam-like means for independently shifting each said grinder means along a path determined by said cam- like means, each said rod being rockable about a fulcrum point intermediate its ends, and means for shifting each rod and fulcrum point in unison toward and away from said cam-like means.

10. A machine for grinding circular saws and similar circular cutters, said machine comprising a base, support means rotatably mounted on said base, a pair of spaced lower slides mounted on said support means and linearly shiftable therealong, a pair of upper slides one each mounted on said lower slides and being shiftable at right angles thereto whereby each upper slide is universally movable in a plane, grinder means operatively mounted on each upper slide for movement therewith, a saw-supporting arbor, means for optionally locking said support means in either of two positions so as to present either of said grinder means toward said arbor, cam-like means operatively associated with each upper slide, and means connected to each upper slide and movable along said cam-like means for independently shifting each said grinder means along a path determined by said cam-like means.

11. A machine for grinding circular saws and similar circular cutters, said machine comprising a base, support means rotatably mounted on said base, a pair of spaced lower slides mounted on said support means and linearly shiftable therealong, a pair of upper slides one each mounted on said lower slides and being shiftable at right angles thereto whereby each upper slide is universally movable in a plane, grinder means operatively mounted on each upper slide for movement therewith, a saw-supporting arbor, means for optionally locking said support means in either of two positions so as to present either of said grinder means toward said arbor, cam-like means operatively associated with each upper slide, and a rod operatively connected to each upper slide and movable along said cam-like means for independently shifting each said grinder means along a path determined by said cam-like means, each said rod being rockable about a fulcrum point intermediate its ends.

12. A machine for grinding circular saws and similar circular cutters, said machine comprising a base, support means rotatably mounted on said base, a pair of spaced lower slides mounted on said support means and linearly shiftable therealong, a pair of upper slides one each mounted on said lower slides and being shiftable at right angles thereto whereby each upper slide is universally movable in a plane, grinder means operatively mounted on each upper slide for movement therewith, a saw-supporting arbor, an indexing arm mounted on said base and operatively associated with said saw arbor, means for optionally locking said support means in either of two positions so as to present either of said grinder means toward said arbor, cam-like means operatively associated with each upper slide, and means connected to each upper slide and movable along said cam-like means for independently shifting each said grinder means along a path determined by said cam-like means.

References Cited in the file of this patent

UNITED STATES PATENTS

| | | |
|---|---|---|
| 595,065 | Jones | Dec. 7, 1897 |
| 815,610 | Bishop | Jan. 23, 1906 |
| 1,051,153 | Nelson | Jan. 21, 1913 |
| 1,796,663 | Osgood | Mar. 17, 1931 |